United States Patent
Bächle et al.

(10) Patent No.: US 8,161,623 B2
(45) Date of Patent: Apr. 24, 2012

(54) METHOD OF MANUFACTURING AN ARTICULATED SHAFT STRUCTURE

(75) Inventors: Bernard Bächle, Ravensburg (DE);
Andreas Mahling, Meckenbeuren (DE);
Hans Roth, Salem (DE)

(73) Assignee: IFA Technologies GmbH, Haldensleben (DE)

( * ) Notice: Subject to any disclaimer, the term of this patent is extended or adjusted under 35 U.S.C. 154(b) by 328 days.

(21) Appl. No.: 12/586,178

(22) Filed: Sep. 19, 2009

(65) Prior Publication Data
US 2010/0162785 A1    Jul. 1, 2010

Related U.S. Application Data

(62) Division of application No. 11/518,548, filed on Sep. 8, 2006, now abandoned.

(30) Foreign Application Priority Data

Sep. 9, 2005 (DE) .......................... 10 2005 042 839

(51) Int. Cl.
*B23P 19/02* (2006.01)
*B21D 43/28* (2006.01)

(52) U.S. Cl. ........................................... 29/525; 72/324
(58) Field of Classification Search ................... 29/525, 29/505, 428, 469, 506, 510; 72/324; 464/87, 464/89, 92, 93, 137, 182
See application file for complete search history.

(56) References Cited

U.S. PATENT DOCUMENTS

| | | | | |
|---|---|---|---|---|
| 3,500,658 A | * | 3/1970 | Goody | 464/99 |
| 6,261,108 B1 | * | 7/2001 | Kanagawa et al. | 439/98 |
| 6,626,763 B2 | * | 9/2003 | Aoki et al. | 464/99 |

\* cited by examiner

*Primary Examiner* — John C Hong
(74) *Attorney, Agent, or Firm* — Klaus J. Bach

(57) ABSTRACT

In a method of manufacturing an articulated shaft structure for the transfer of torque from a transmission to a differential drive, including a connecting flange having a tube section, a shaft plate disposed between the connecting flange and a transmission output flange and forming a torsion element for accommodating some articulation of the connecting flange relative to the output flange, and a centering part extending from the connecting flange for aligning the articulated shaft relative to a transmission shaft, the connecting flange is formed integrally with the tube section by deep-drawing in follow-on tool the tube section and, in the same manufacturing step, punching openings into the flange, and deep-drawing the centering part and pressing it into the tube section.

4 Claims, 2 Drawing Sheets

METHOD OF MANUFACTURING AN ARTICULATED SHAFT STRUCTURE

This is a Divisional Application of patent application Ser. No. 11/518,548 filed Sep. 8, 2006 now abandoned and claiming the priority of German application 10 2005 042 839.8 filed Sep. 9, 2005.

BACKGROUND OF THE INVENTION

The invention relates to a method of manufacturing an articulated shaft structure for the transmission of a torque from a transmission to a differential drive of a motor vehicle, including a connecting flange with a tube section for coupling the articulated shaft with a transmission output shaft, an articulation disc which forms a torsion element and a centering part, which is pressed into the connecting flange for aligning the articulated shaft with respect to the transmission output shaft.

An articulated shaft with these features is known from DE 199 54 475 C1. The connecting flange of the articulated shaft described therein is a forged component which is manufactured in three steps. In the first manufacturing step, the connecting flange is forged to an unfinished product. In the second manufacturing step, a tube section for the connection to a hollow shaft is machined. In the third manufacturing step, the openings for the connecting bolts and a center opening for receiving the centering components are drilled. The articulated shaft is assembled by welding the tube section to the hollow shaft, pressing the centering component into the center opening, filling the centering component with grease and closing it with a cover. Because of the different types of manufacturing processes, the manufacture of the connecting flange including the tube section is very costly.

It is the object of the present invention to provide a method of manufacturing an articulated shaft structure which is easier and less expensive to manufacture.

SUMMARY OF THE INVENTION

In a method of manufacturing an articulated shaft structure for the transfer of torque from a transmission to a differential drive, including a connecting flange having a tube section, a shaft plate disposed between the connecting flange and a transmission output flange and forming a torsion element for accommodating some articulation of the connecting flange relative to the output flange, and a centering part extending from the connecting flange for aligning the articulated shaft relative to a transmission shaft, the connecting flange is formed integrally with the tube section by deep-drawing in follow-on tool the tube section and, in the same manufacturing step, punching openings into the flange, and deep-drawing the centering part and pressing it into the tube section.

In accordance with the present invention, the connecting flange and the tube section which is formed by deep drawing from the flange, are manufactured within a follow-on tool in a single manufacturing step in which, furthermore, also the flange openings are punched out. Since, in comparison with the state of the art, two manufacturing steps are eliminated the costs of manufacturing the articulated shaft are reduced.

In a particular embodiment of the invention, a support element for centering a shaft plate with respect to the connecting flange is installed so as to be supported by the centering support element. The support element is disc-shaped in a radial direction and has a pot-like axially extending section. The axially extending section again is centered at an annular collar of the centering support element.

Preferred embodiments of the invention will be described below on the basis of the accompanying drawings.

DETAILED DESCRIPTION OF PREFERRED EMBODIMENTS

Figure 1:
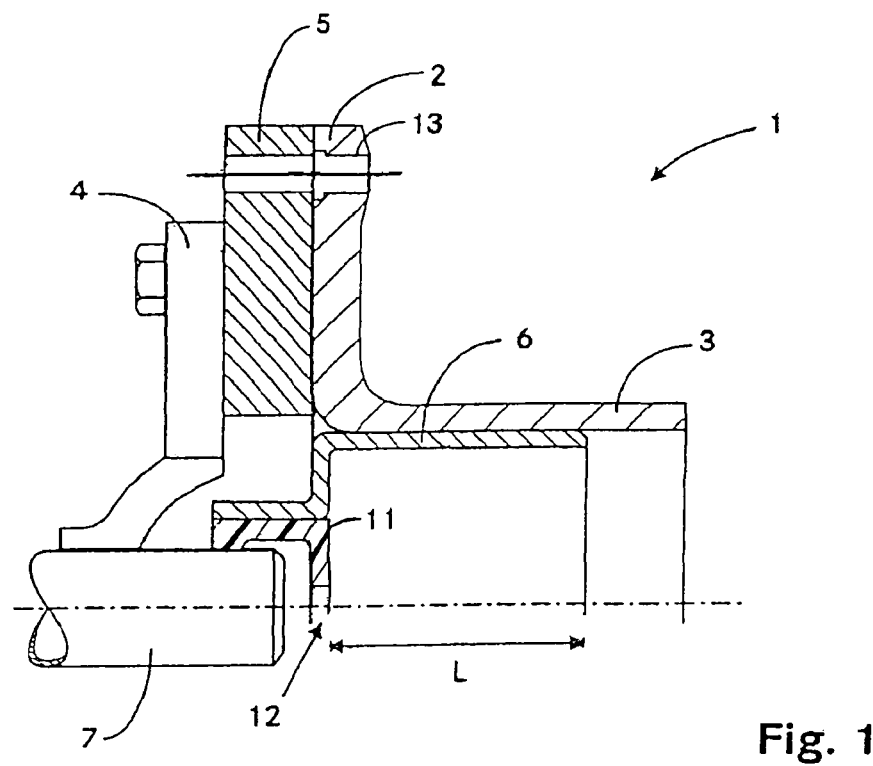
FIG. 1 shows a first embodiment of an articulated shaft.

FIG. 1 shows a first embodiment of an articulated shaft structure 1 in accordance with the invention. The articulated shaft structure 1 comprises a centering part 6, a connecting flange 2 and a tube section 3. The connecting flange 2 and the tube section 3 are joined so as to be a single piece. A hollow shaft which is not shown is welded to the tube section 3 and extends to the differential gear. The centering part 6 is pressed into the connecting flange 2 and the tube section 3 over a length L. The resulting support area of the centering part 6 is larger than that of articulated shafts known in the art. As a result, an improved centering accuracy is achieved without increased expenses. By means of the centering part 6, the articulated shaft structure 1 is aligned with the transmission pivot 7 as the transmission pivot extends into the centering part 6. At the inner circumference of the centering part 6, an annular elastomer member 11 as well as a membrane with a venting opening 12 may be arranged which may be directly vulcanized onto the annular elastomer member or may be formed integrally therewith: In contrast to the centering part of the state of the art no cover is provided.

The torque is transferred from a transmission via a drive shaft including the articulated shaft structure 1 to the differential gear and vice versa via a shaft joint plate 5 to the connecting flange 2 and then to the tube section 3. To this end, the transmission output shaft flange 4 and the shaft joint plate 5 are bolted together. By the shaft joint plate 5, the torsion vibrations in the drive line are attenuated. In addition, any slight kink in the drive line or off-center position of the differential gear can be accommodated by the shaft joint plate 5 and the elastomer member 11.

In practice, the articulated shaft is manufactured as follows:

In a first manufacturing step, the connecting flange 2 and the tube section 3 are deep-drawn and bores 13 are punched into the flange 2 in a follow-on tool. Then, in a second manufacturing step, the centering part 6 is deep-drawn and the elastomer is vulcanized into it. Finally, in a third manufacturing step, the centering part 6 is pressed into the connecting flange 2 and into the tube section 3 over the length L.

Figure 2:
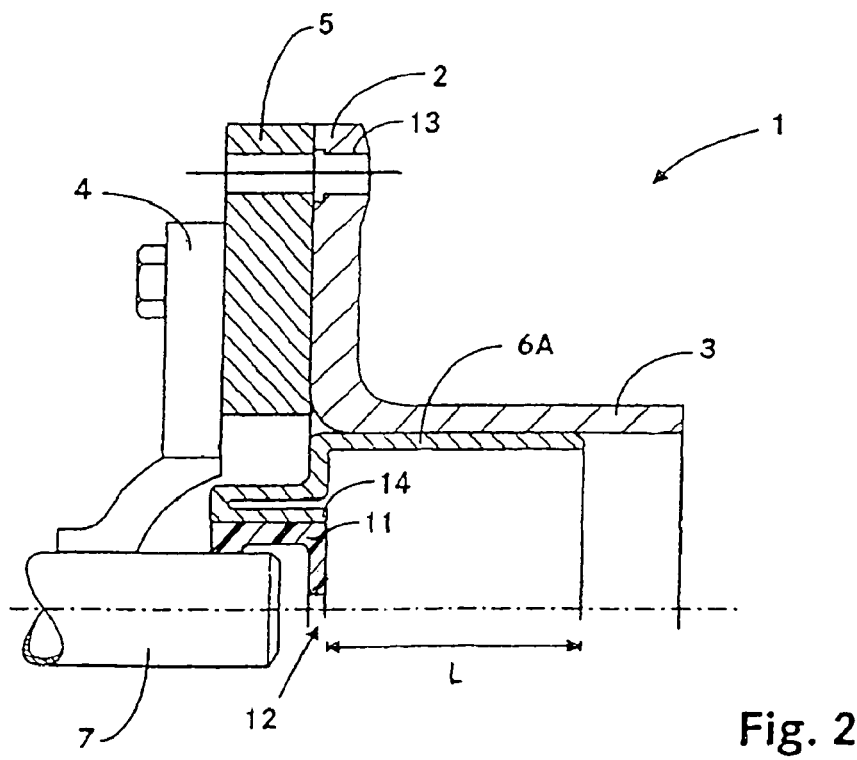
FIG. 2 shows a second embodiment of an articulated shaft.

In FIG. 2 another embodiment of the articulated shaft is shown. In this embodiment, a centering part 6A has an end section 14 which is folded inwardly. In this way, the spring stiffness of the centering part 6A is increased since its radial rigidity is increased in the core of the fold. Otherwise, the arrangement is the same as that of FIG. 1 so that the description of FIG. 1 applies also to FIG. 2.

Figure 3:
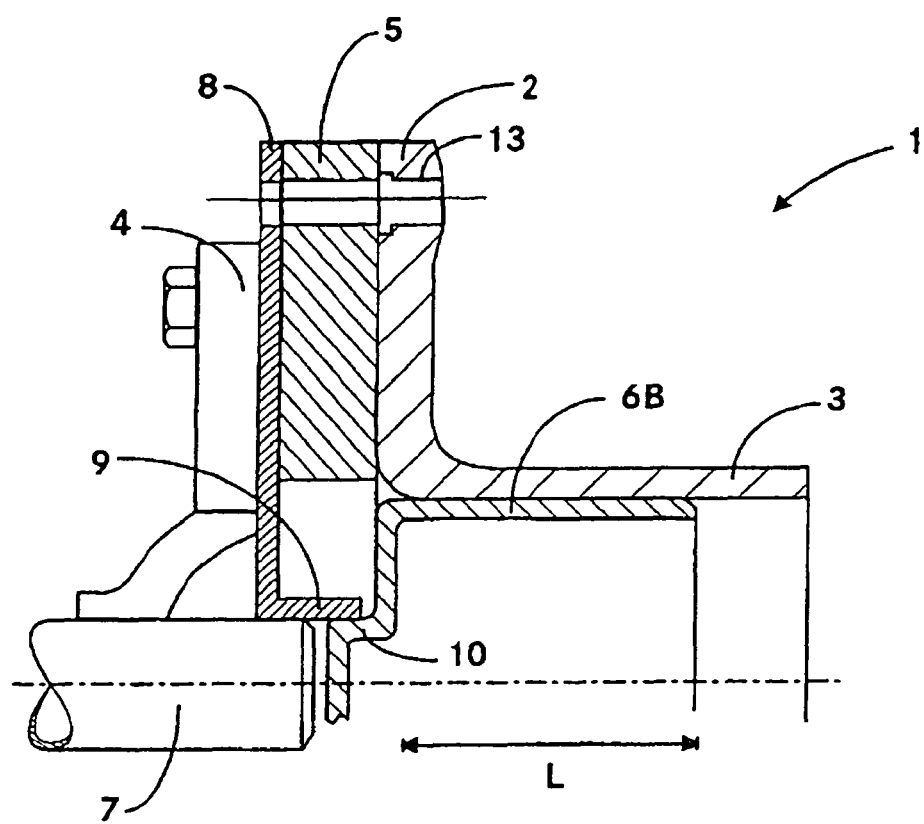
FIG. 3 shows an articulated shaft with a support element.

FIG. 3 shows an articulated shaft structure 1 with a support element 8. The articulated shaft structure 1 comprises the centering part 6B, the connecting flange 2 and the tube section 3, which is formed integrally with the flange 2 so as to form a single piece. As centering part of course also the centering part 6 of FIG. 1 or the centering part 6A of FIG. 2 may be installed: Between the transmission output flange 4 and the connecting flange 2, the support element 8 and the shaft joint plate 5 are arranged. The support element 8 forms at its radially inner end a centering structure for centering the shaft joint plate 5 with respect to the connecting flange 2 during assembly. The support element 8 is disc-like in the radial direction and provided with a sleeve 9 extending in axial direction and forming an extension of the transmission pivot 7 upon assembly of the articulated shaft structure 1. The sleeve 9 is supported on an annular neck 10 of the centering part 6B whereby the support element 8 and, as a result, the shaft joint plate 5 are centered radially with respect to the connecting flange 2. The three components are axially fixed relative to one another by way of screws.

The method of manufacturing the articulated shaft structure according to the invention has the following advantages over conventional designs:

- the manufacture of the connecting flange with the tube section is more cost-effective since two manufacturing steps are eliminated;
- the support surface of the pressed-in centering part is larger whereby the centering accuracy is improved;
- the supportive centering part facilitates the assembly, and no cover for the centering part needs to be installed.

What is claimed is:

1. A method for the manufacture of an articulated shaft structure (1) for transferring of torque from a transmission to a differential drive, comprising a connecting flange (2) including a tube section (3) for coupling the articulated shaft structure (1) to a transmission output flange (4) mounted on a transmission output shaft (7), a shaft joint plate (5) disposed between the connecting flange (2) and the transmission output flange (4) and forming a torsion element accommodating also some articulation of the connecting flange (2) relative to the output flange (4) and a centering part (6, 6A, 6B) being disposed in the connecting flange (2) and the tube section (3) and engaging the transmission output shaft (7) for aligning the articulated shaft (1) relative to the transmission output shaft (7), said method comprising the steps of:

deep-drawing and punching in a follow-on tool the connecting flange (2) so as to form the tube section (3) and punching holes into the flange in a single first manufacturing step, deep-drawing the centering part (6, 6A, 6B) in a second manufacturing step and, in a third manufacturing step, pressing the centering part (6, 6A, 6B) into the connecting flange (2) and into the tube section (3) thereof for engagement with the transmission output shaft (7) to ensure alignment of the articulated shaft structure (1) with the transmission output shaft (7) upon assembly of the articulated shaft structure (1).

2. A method according to claim 1, wherein a support element (8) connected to the shaft joint plate (5) which, upon assembly of the articulated shaft structure engages the centering part (6B) for centering the shaft plate (5) relative to the connecting flange (2).

3. A method according to claim 2, wherein upon assembly, a disk section of the support element (8) is disposed adjacent the shaft joint plate (5) and a central sleeve section (9) is engaged with the centering part (6B).

4. A method according to claim 2, wherein the centering part (6B) includes a collar (10) projecting axially toward the output flange (4) and the support element (8) engages the collar (10) at its outer circumference for centering.

\* \* \* \* \*